United States Patent
Ishida

[11] Patent Number: 5,949,565
[45] Date of Patent: Sep. 7, 1999

[54] PORTABLE ELECTRONIC APPARATUS

[75] Inventor: Tetsuro Ishida, Tokyo, Japan

[73] Assignee: Kabushiki Kaisha Toshiba, Kawasaki, Japan

[21] Appl. No.: 08/825,553

[22] Filed: Mar. 19, 1997

[30]   Foreign Application Priority Data

Sep. 20, 1996 [JP] Japan .................................. 8-250044

[51] Int. Cl.$^6$ ............................. H04B 10/00; H05K 5/00; H05K 7/00; G06F 1/16
[52] U.S. Cl. ......................... 359/154; 359/154; 359/152; 359/163; 359/172; 361/683; 361/729; 364/708.1
[58] Field of Search .................................. 359/154, 172, 359/163, 152; 345/901, 903, 169; 361/680; 439/31

[56]            References Cited

U.S. PATENT DOCUMENTS

| 5,237,488 | 8/1993 | Moser et al. ............................. 361/729 |
| 5,307,297 | 4/1994 | Iguchi et al. ......................... 364/708.1 |
| 5,433,620 | 7/1995 | Kobayashi ............................. 439/165 |
| 5,781,407 | 7/1998 | Brauel ..................................... 361/683 |

FOREIGN PATENT DOCUMENTS

| 3625042 | 2/1997 | Germany . |
| 8-46385 | 2/1996 | Japan . |

*Primary Examiner*—Jason Chan
*Assistant Examiner*—Mohammad Sedighian
*Attorney, Agent, or Firm*—Finnegan, Henderson, Farabow, Garrett & Dunner, L.L.P.

[57]            ABSTRACT

A display unit is rotatably supported on an apparatus body of a portable electronic apparatus, by a hinge portion. The display unit has a hollow boss projecting into the apparatus body, and the boss is engaged with the apparatus body to be rotatable around the rotation center axis of the hinge portion. An inner hole in the boss communicates with the inside of the display unit and with the inside of the apparatus body, thereby forming a communication path coaxial with the rotation center axis. In the apparatus body, there is provided a light emission element for emitting image data to be transmitted to the display unit, in form of an optical signal into the communication path. In the display unit, there is provided a light receive element for receiving the optical signal from the light emission element through the communication path.

18 Claims, 9 Drawing Sheets

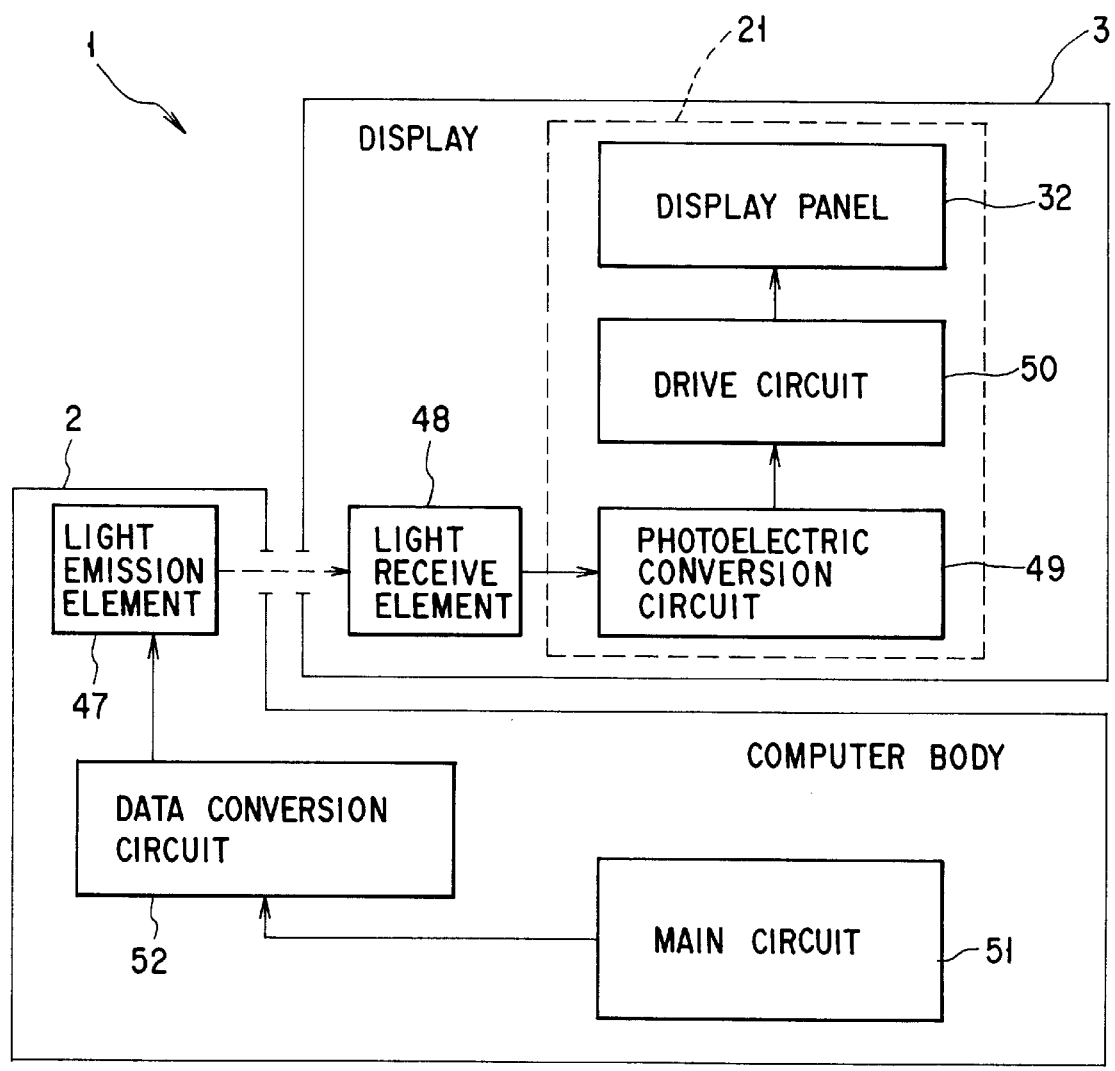
F I G. 3

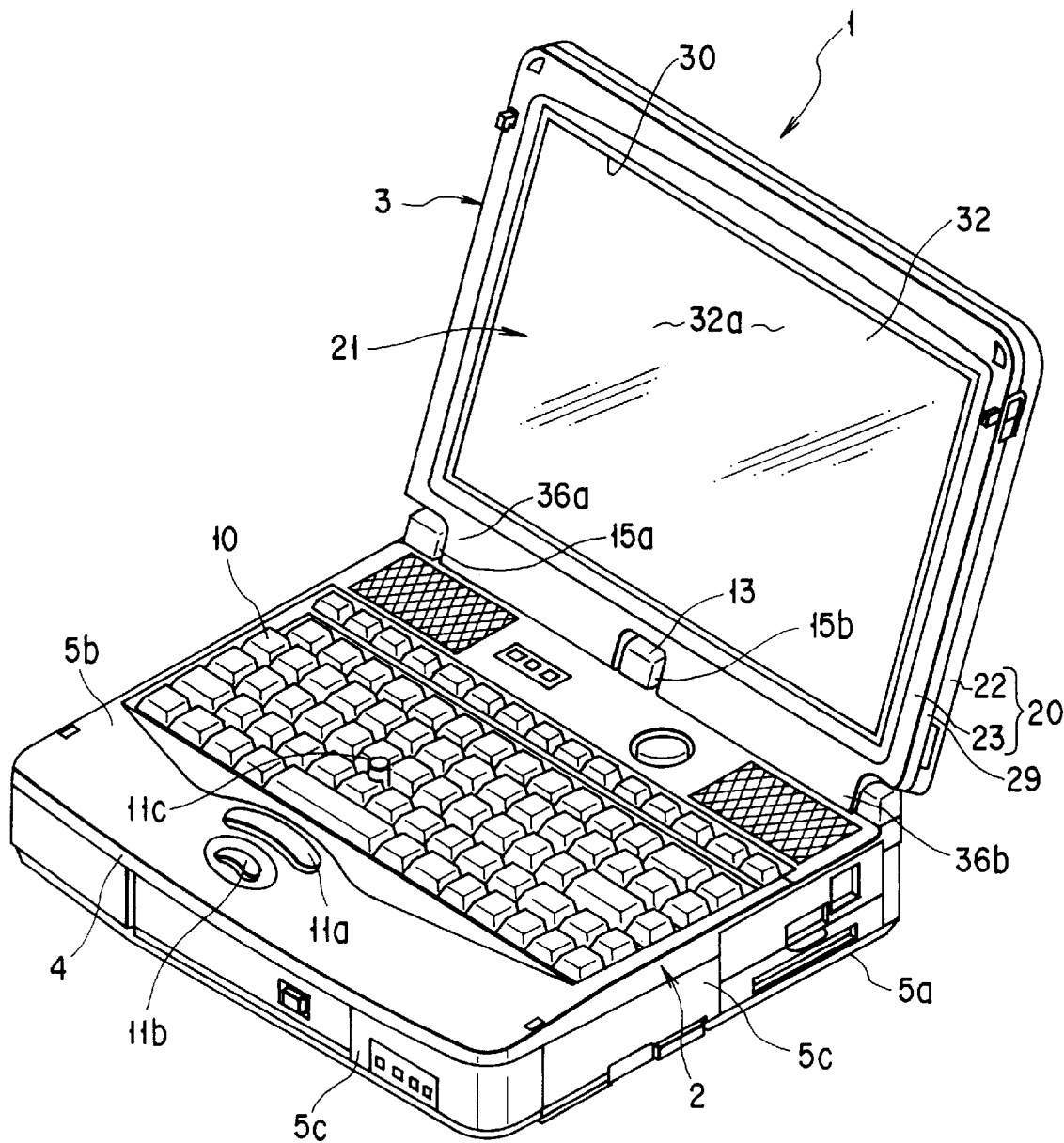
F I G. 5

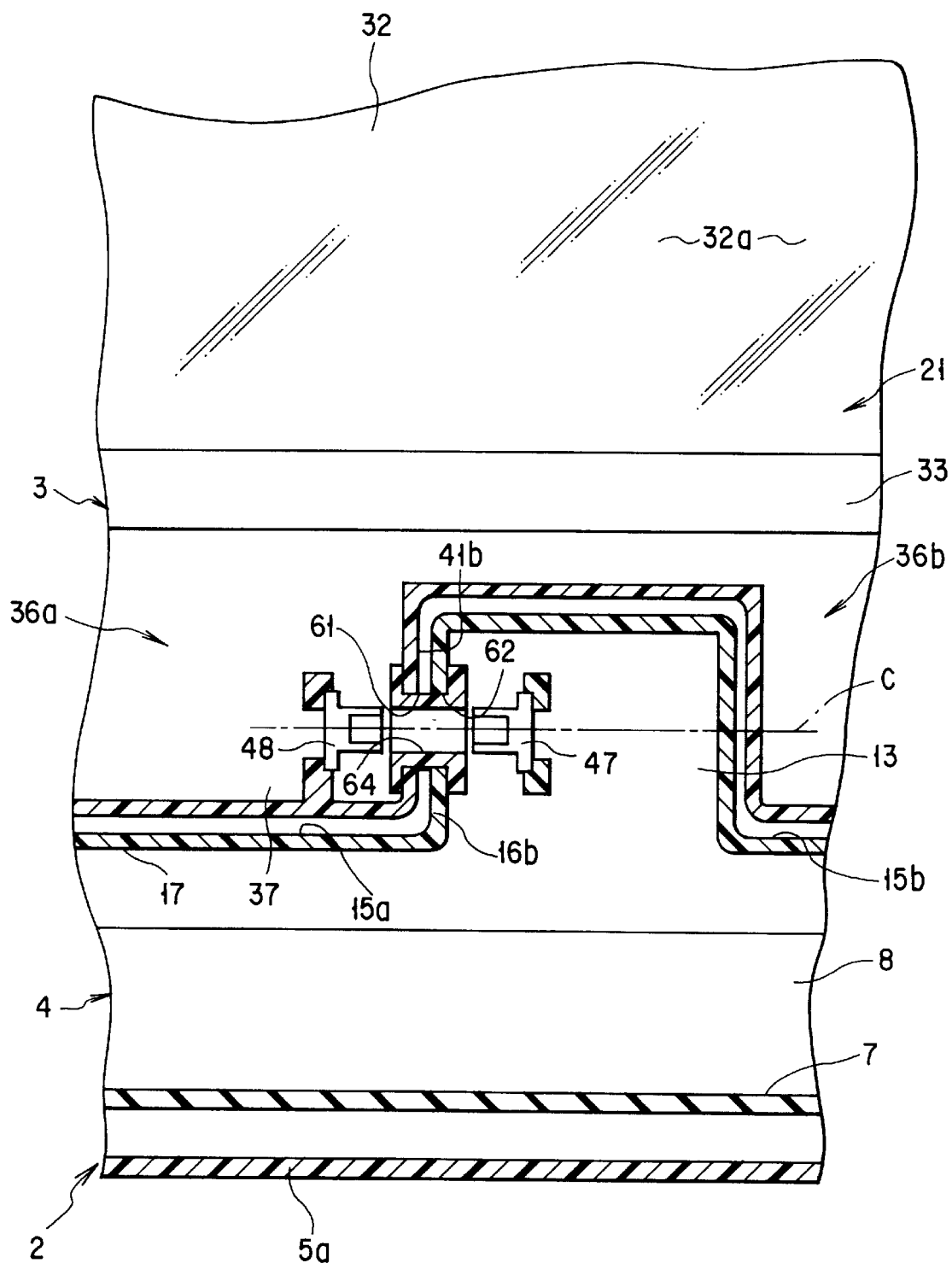
F I G. 6

PORTABLE ELECTRONIC APPARATUS

BACKGROUND OF THE INVENTION

The present invention relates to a portable electronic apparatus such as a portable computer, a word processor, or the like in which image data is transmitted from a main body of the apparatus to a display device to display an image.

A portable electronic apparatus such as a portable computer comprises a computer body having a keyboard, and a display unit including a liquid crystal display device. The display unit is supported on the computer body by a hinge portion. By the rotation of the hinge portion, the display unit is rotatable between a close position in which the display unit covers the keyboard from upside and an open position in which the display unit stands behind the keyboard.

Conventionally, in this portable electronic apparatus, a control circuit in the computer body is connected with the liquid crystal display device of the display unit by means of a bundle of leads, and image data prepared in the control circuit of the computer body is transmitted as image signals to the liquid crystal display device of the display unit, through the bundle of leads. This bundle of leads is normally provided in the hinge section serving as a connecting portion for connecting the computer body and the display unit.

In addition, the control circuit in the computer body is connected with the liquid crystal display device in the display unit, by a flexible printed circuit (FPC), in place of the bundle of leads. This FPC is provided in the hinge portion.

However, according to the conventional structure as described above, since a bundle of leads for connecting the control circuit in the computer body with the liquid crystal display unit in the display unit is provided in the hinge portion which is moved when rotating the display unit between the close position and the open position, the bundle of leads is moved together with the hinge portion when rotating the display unit. Therefore, the bundle of leads receives a bending moment or a twisting moment due to rotation of the hinge portion, and are partially deflected or twisted so that the bundle of leads may be broken.

In particular, with the portable electronic apparatus such as a portable computer, the display unit is closed when carrying the computer, and is opened when using the computer. Thus, the number of times for which the display unit is opened and closed is increased, so that the bundle of leads is repeatedly applied with a load and the durability of the leads is deteriorated.

In recent years, the number of pixels of the liquid crystal display device of a display unit has been increased, so that liquid crystal display devices have come to be able to display a color image. Accordingly, the number of signals required for displaying an image has been greatly increased. Therefore, the number of leads for transmitting signals must be increased, resulting in that the diameter of a bundle of leads is increased. In contrast, the hinge portion has only a small space which can be shared for leads, and therefore, a bundle of leads cannot be arranged with sufficient margins. Hence, a problem has arisen in that the bundle of leads must be tightened so hard that the leads may be broken with high possibility.

Further, in the case where an FPC is used in place of a bundle of leads, the width of the FPC must be enlarged when the number of signals required for displaying an image is increased. A problem similar to the above occurs.

BRIEF SUMMARY OF THE INVENTION

The present invention has been made in view of the above situation, and its object is to provide a portable electronic apparatus in which transmission of signals between the main body and the display device of the apparatus in a cordless manner.

To achieve the above object, the portable electronic apparatus according to the present invention comprises: a first unit; a second unit rotatably connected with the first unit through a hinge portion; communication means for defining a communication path extending to be coaxial with a rotation center axis of the hinge portion and having one end communicating with an inner space of the first unit and another end communicating with an inner space of the second unit; transmission means provided in the first unit, for transmitting a data signal to the second unit through the communication path; and receiver means for receiving the data signal from the transmission means, provided in the second unit such that the receiver mean faces the transmission means through the communication path.

According to the present invention, the transmission means has a light emission element for emitting an optical signal, provided so as to face the end of the communication path, and the receiver means has a light receive element for receiving the optical signal, provided so as to face the other end of the communication path.

According to the portable electronic apparatus constructed in a structure as described above, a data signal is transmitted from the transmission means or the light emission element and is received by the receiver means or the light receive element through a communication path, when a data signal is sent from the first unit to the second unit. The data signal thus received is further supplied to the second unit. In this manner, no wirings need not be provided between the first and second units, so that transmission and receipt of signals can be realized in a cordless manner.

Further, the portable electronic apparatus according to another aspect of the present invention comprises: an apparatus body; a display device rotatably connected with the apparatus body through a hinge portion, and including display means for displaying an image; communication means for defining a communication path extending to be coaxial with a rotation center axis of the hinge portion and having one end communicating with an inner space of the apparatus body and another end communicating with an inner space of the display device; transmission means provided in the apparatus body, for transmitting image data to be displayed by the display device, in form of an image signal; and receiver means for receiving the image signal from the transmission means, provided in the display device such that the receiver mean faces the transmission means through the communication path.

According to the present invention, the transmission means has a light emission element for emitting an optical signal, provided to be engaged in the end of the communication path and to be coaxial with the rotation center axis, and circuit means for supplying the image data to the light emission element, provided in the apparatus body. The receiver means has a light receive element for receiving the optical signal, provided to be engaged in the other end of the communication path and to be coaxial with the rotation center axis, and conversion circuit means provided in the display device, for converting the optical signal received by the light receive means, into the image signal, and for supplying the image signal to the display means.

According to the portable electronic apparatus constructed in a structure as described above, an image signal is transmitted from the transmission means or the light emission element and the image signal is received by the receiver means or the light receive element through a communication path, when an image signal is sent from the apparatus body to the display unit. The image signal thus received is supplied to the display means. In this manner, no wirings need not be provided between the apparatus body and the display unit, so that image signals can be sent to the display unit in a cordless manner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 3 show a portable computer according to an embodiment of the present invention, in which:

FIG. 1 is a perspective view of the portable computer,

FIG. 2 is a sectional view showing the structure of a connecting portion between an apparatus body and a display unit of the portable computer, and FIG. 3 is a block diagram schematically showing a circuit configuration of the portable computer;

FIGS. 5 and 6 show a portable computer according to a second embodiment of the present invention, in which:

FIG. 5 is a perspective view showing the portable computer, and

FIG. 6 is a sectional view showing the structure of a connecting portion between an apparatus body and a display unit of the portable computer;

DETAILED DESCRIPTION OF THE INVENTION

In the following, an embodiment adopting the present invention in a portable computer of A4 size will be described in detail with reference to the drawings.

Figure 1:
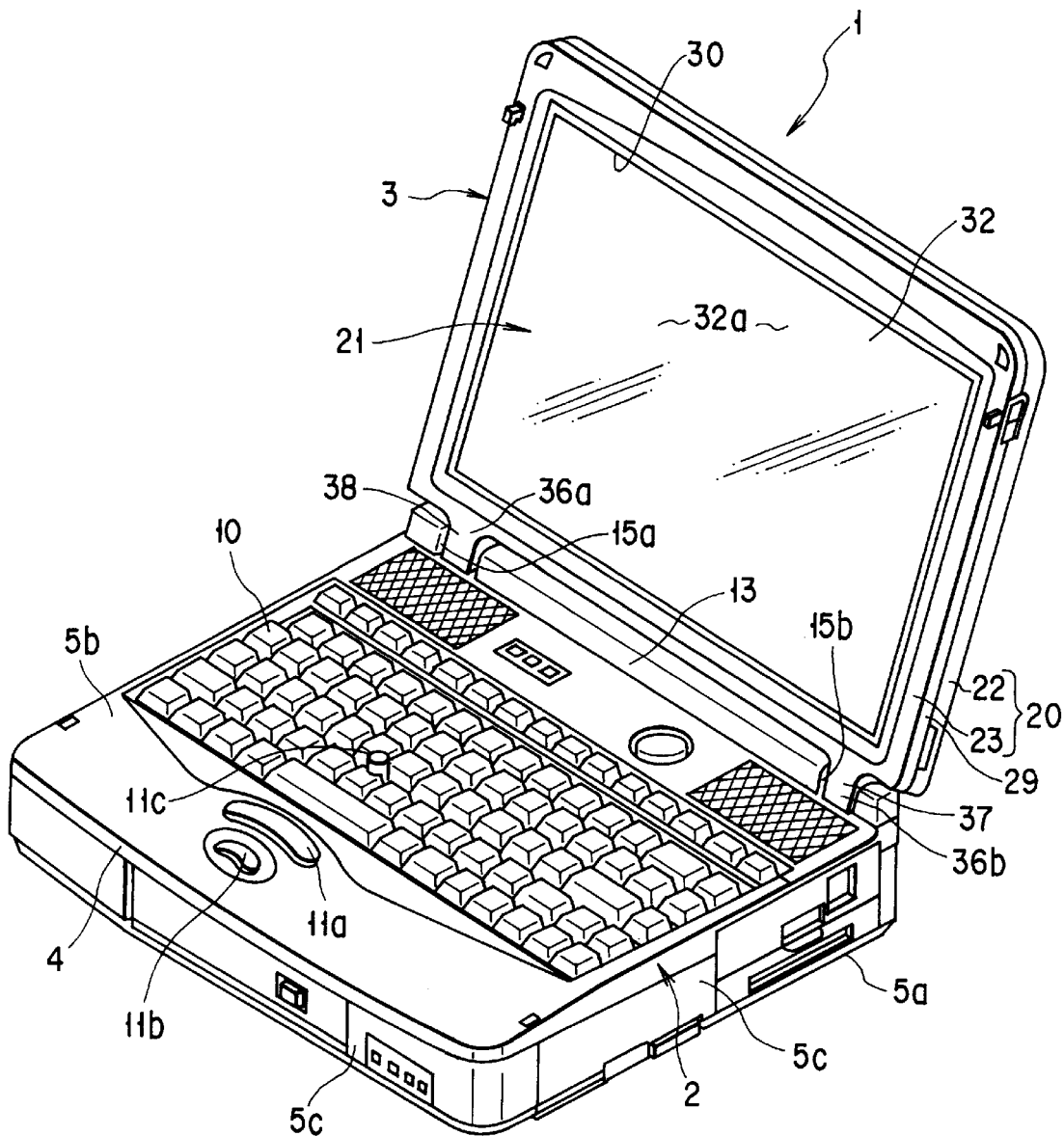

As shown in FIG. 1, a portable computer 1 comprises an apparatus body 2 which serves as a first unit, and a display unit 3 supported on the apparatus body and serving as a display device or a second unit.

The apparatus body 2 has a housing 4 having a shape like a flat rectangular box. This housing 4 includes a flat bottom wall 5a, an upper wall 5b opposed to the bottom wall 5a, and four peripheral walls 5c continuous to the peripheries of the bottom wall 5a and the upper wall 5b.

Figure 2:
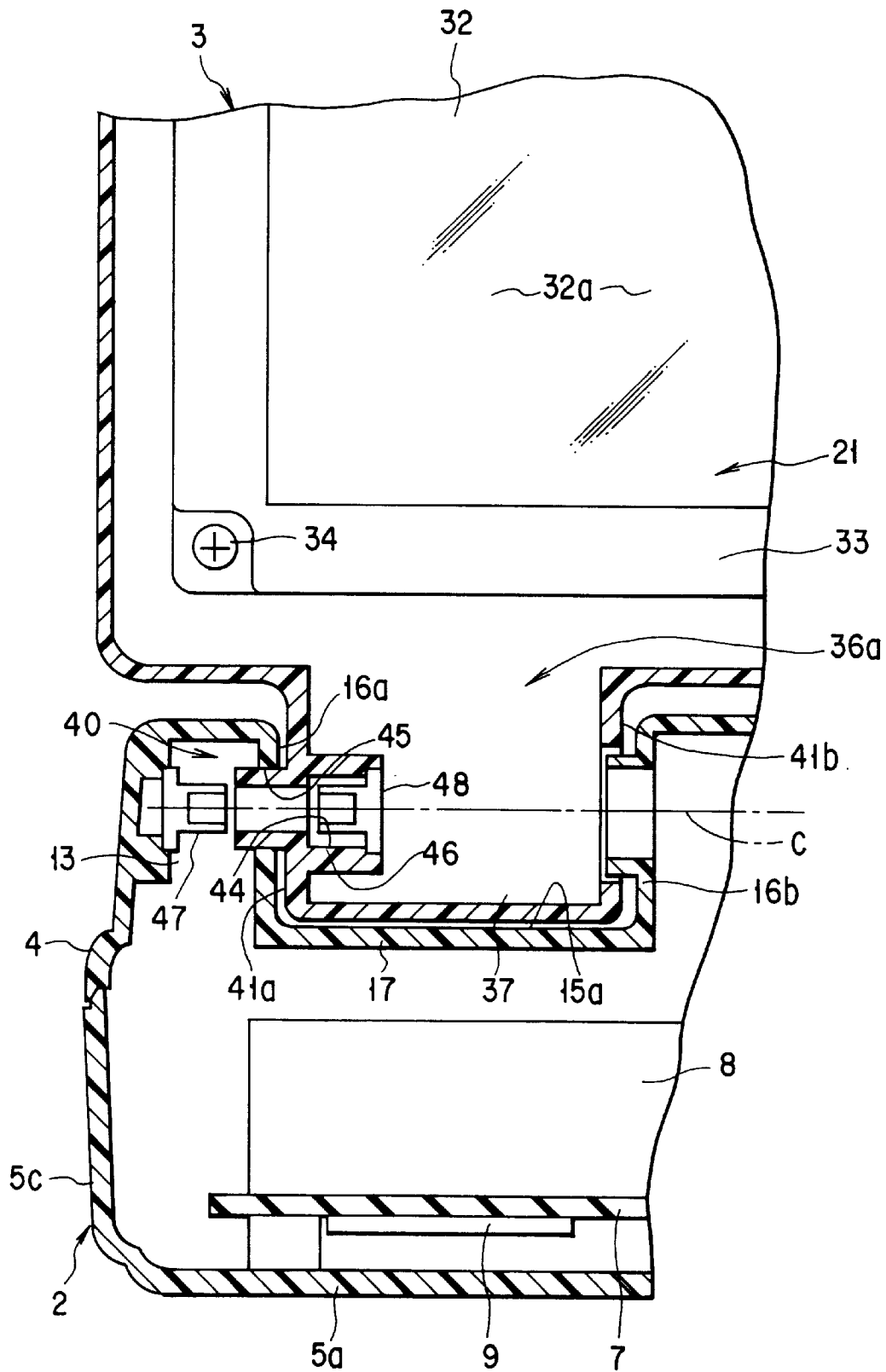

As shown in FIG. 2, a circuit board 7 as a kind of functional component is arranged in the housing 4. The circuit board 7 is placed in substantially parallel with the bottom wall 5a of the housing 4. On the circuit board 7 are mounted a hard disc drive 8 and a circuit elements 9 such as a DRAM and a number of other electronic components.

As shown in FIG. 1, a keyboard 10 as an input means, a pointing button 11c, click buttons 11a and 11b, and the likes are provided on the upper wall 5b of the housing 4. In addition, a convex portion 13 is formed at a rear end portion of the upper wall 5b, and extends throughout the entire length of the housing 4 in the widthwise direction of the housing 4. The convex portion 13 is formed to be hollow, and the inside of the portion 13 communicates with the inside of the housing 4.

The convex portion 13 is provided with first and second display support portions 15a and 15b. The first and second display support portions 15a and 15b are provided apart from each other in the widthwise direction of the housing 4. Each of the support portions 15a and 15b is defined formed by a concave portion continuously opened in the front, upper, and rear sides of the convex portion 13. Further, as representatively indicated by a display support portion 15a in FIG. 2, this display support portion includes a pair of side walls 16a and 16b facing each other and extending to be perpendicular to the upper wall 5b, and a bottom wall 17 bridged between the side walls 16a and 16b and extending in the same plane as the upper wall of the housing 4.

The display unit 3 comprises a display housing 20 and a liquid crystal display device 21 contained in the display housing. The display housing 20 includes a rear panel 22 and a front panel 23 connected to the rear panel 22. The display housing 20 has a shape like a flat rectangular box, as a whole. The front panel 23 is formed with a rectangular opening 30 having a size corresponding to the liquid crystal display device 21.

The liquid crystal display device 21 has a liquid crystal display panel 32 having a display screen 32a, and a frame 33 supporting the liquid crystal display panel 32. The liquid crystal display device 21 is contained in the display housing 20, by fixing corner portions of the frame 33 to the rear panel 22 by means of screws 34. Further, the display screen 32a of the liquid crystal display panel 32 is exposed to the outside through the opening of the front panel 23.

As shown in FIGS. 1 and 2, the display housing 20 has first and second support legs 36a and 36b. Each of the first and second legs 36a and 36b is constructed by abutting a rear half 37 continuous to the rear panel 22 with a front half 38 continuous to the front panel 23. Each of the legs 36a and 36b has a shape like a hollow rectangular tube.

The first and second support legs 36a and 36b respectively project from the side walls of the display housing 20, and are arranged apart from each other in the widthwise direction of the display housing 20. Further, the first and second support legs 36a and 36b are respectively inserted into the first and second display support portions 15a and 16b of the housing 4. Each of the support legs 36a and 36b has a pair of side walls 41a and 41b, and these side walls 41a and 41b respectively face the side walls 16a and 16b of the display support portion 15a, with a predetermined gap.

The first support leg 36a is supported on the housing 4 of the apparatus body 2, by a hinge portion (or hinge device) 40 which also functions as an optical communication portion. The second support leg 36b is supported on the housing 4 by a conventional hinge portion (or hinge device). The hinge portion of the second support leg 36 has a structure normally applied, and therefore, detailed explanation of this hinge will be omitted herefrom.

The hinge portion 40 of the first support leg 36a includes a boss 44 having a cylindrical shape and projecting from one side wall 41a of the first support leg 36a in the widthwise direction of the housing 4, and a circular hole 45 formed in the side wall 16a of the display support portion 15a. The boss 44 is rotatably inserted in the hole 45 and functions as a rotation shaft. The hole 45 serves as a bearing portion. In this manner, the display unit 3 is rotatable between a close position in which the display unit 3 covers the key board 10 from upside and an open position in which the display unit stands behind the keyboard, about the center axis of the boss 44 serving as a rotation center axis C.

As shown in FIG. 2, the distal end of the boss 44 projects into the convex portion 13 over the side wall 16a of the display support portion 15a. Therefore, the inside of the apparatus body 2 and the inside of the display unit 3 communicate with each other through an inner hole of the boss 44. This inner hole thus functions as a communication path.

In addition, a plating layer 46 made of metal material such as aluminum or the like, which functions as shield means, is formed on the inner surface of the boss 44. Note that an aluminum shield plate may be equipped as a shield means on the inner surface of the boss 44.

In the convex portion 13 of the apparatus body 2, a light emission element 47 is provided in the vicinity of the distal end portion of the boss 44 of the hinge portion 40. The light emission element 47 functions as a transmitter portion (or light emission portion) for transmitting image signals prepared by a circuit of the apparatus body 2 described later, in form of optical signals. Although the light emission element 47 may be a type of emitting visible light, this element should preferably be a type of emitting an infrared ray.

Meanwhile, in the first support leg 36a of the display unit 3, a light receive element 48 for receiving light from the light emission element 47 through the boss 44 is provided in the vicinity of the base end portion of the boss 44 of the hinge portion 40.

The light emission element 47 and the light receive element 48 are arranged to be coaxial with the rotation center axis C of the hinge portion 40, and the light emission surface of the light emission element 47 faces the light receive surface of the light receive element 48 through the inner hole of the boss 44. Therefore, since the display unit 3 is rotated around the rotation center axis C, in relation to the apparatus body 2, the light emission surface of the light emission element 47 is continuously kept facing the light receive surface of the light receive element 48, on the rotation center axis C, even when the display unit 3 is rotated.

FIG. 3 schematically shows a circuit configuration of the portable computer 1. In the apparatus body 2, there is provided a main circuit 51 for controlling the entire operation of the computer 1. The main circuit 51 performs various data processing for preparing image data to be displayed on the display unit 3, for example, and for preparing parallel image data.

To realize optical transmission, the image data prepared in the main circuit 51 is converted into serial image signals (or optical signals) for optical communication, by a data conversion circuit 52, and is supplied to the light emission element 47. Further, the light emission element 47 emits light on the basis of the image signals.

Meanwhile, the liquid crystal display device 21 of the display unit 3 is provided with an photoelectric conversion circuit 49 for converting image signals received by the light receive element 48 from the light emission element 47, into electric signals, and for converting the electric signals into parallel image signals. The image data converted by the photoelectric conversion circuit 49 is supplied to a drive circuit 50 for driving the display panel 32, and the drive circuit displays an image on the display panel 32, on the basis of the image data.

According to a portable computer having the structure as described above, image data is prepared in the main circuit 51 of the computer body 2 and is transmitted as image signals of light from the light emission element 47 through the data conversion circuit 52, when an image is displayed on the display panel 32 of the display unit 3. Then, the light from the light emission element 47 passes through the boss 44 of the hinge portion 40 and reaches the light receive surface of the light receive element 48. In this manner, image signals received by the light receive element 48 are supplied to the drive circuit 50 through the photoelectric conversion circuit 50, and image display is carried out on the basis of the image signals.

Thus, the hinge shaft of the hinge portion 40 as a connection portion between the apparatus body 2 and the display unit 3 is constructed by the hollow boss 44. The light emission element 47 and light receive element 48, which use the inside of the boss 44 as a light path (or communication path), are respectively arranged in the computer body 2 and the display unit 3. Therefore, transmission and receipt of image signals can be performed between the apparatus body 2 and the display unit 3, in a cordless manner. Further, since optical communication is performed with use of serial data, it is easy to respond to an increase in amount of data necessary for displaying an image, with the same structure. As a result of this, the durability of a personal computer can be improved.

In addition, the light emission element 47 and the light receive element 48 are arranged facing each other, on the rotation center axis C of the hinge portion 40, so that the light emission surface of the light emission element 47 and the light receive surface of the light receive element 48 can be continuously kept facing each other even when the display unit 3 is rotated. As a result of this, the linear propagation of light is ensured and the light receiving accuracy is improved. Therefore, it is very advantageous that accurate transmission and receipt of data are realized and an infrared ray which has a relatively short wavelength and does not much influence other electronic devices can be used.

Further, since the linear propagation of light is thus ensured, transmission losses of light can be reduced. As a result of this, the elements used for transmitting or receiving light can have smaller sizes, and the output of light from the light emission element can be reduced.

Further, the inner hole of the boss 44 in the hinge portion 40, which serves as a light path, is provided with an electromagnetic shield in form of a plating layer 46 on the inner surface of the boss. It is therefore possible to prevent electromagnetic interruption (EMI) and entering of interference wave (or disturbance waves) with respect to optical signals passing through the inner hole of the boss. As a result, data can be transmitted and received with improved reliability.

Figure 4:
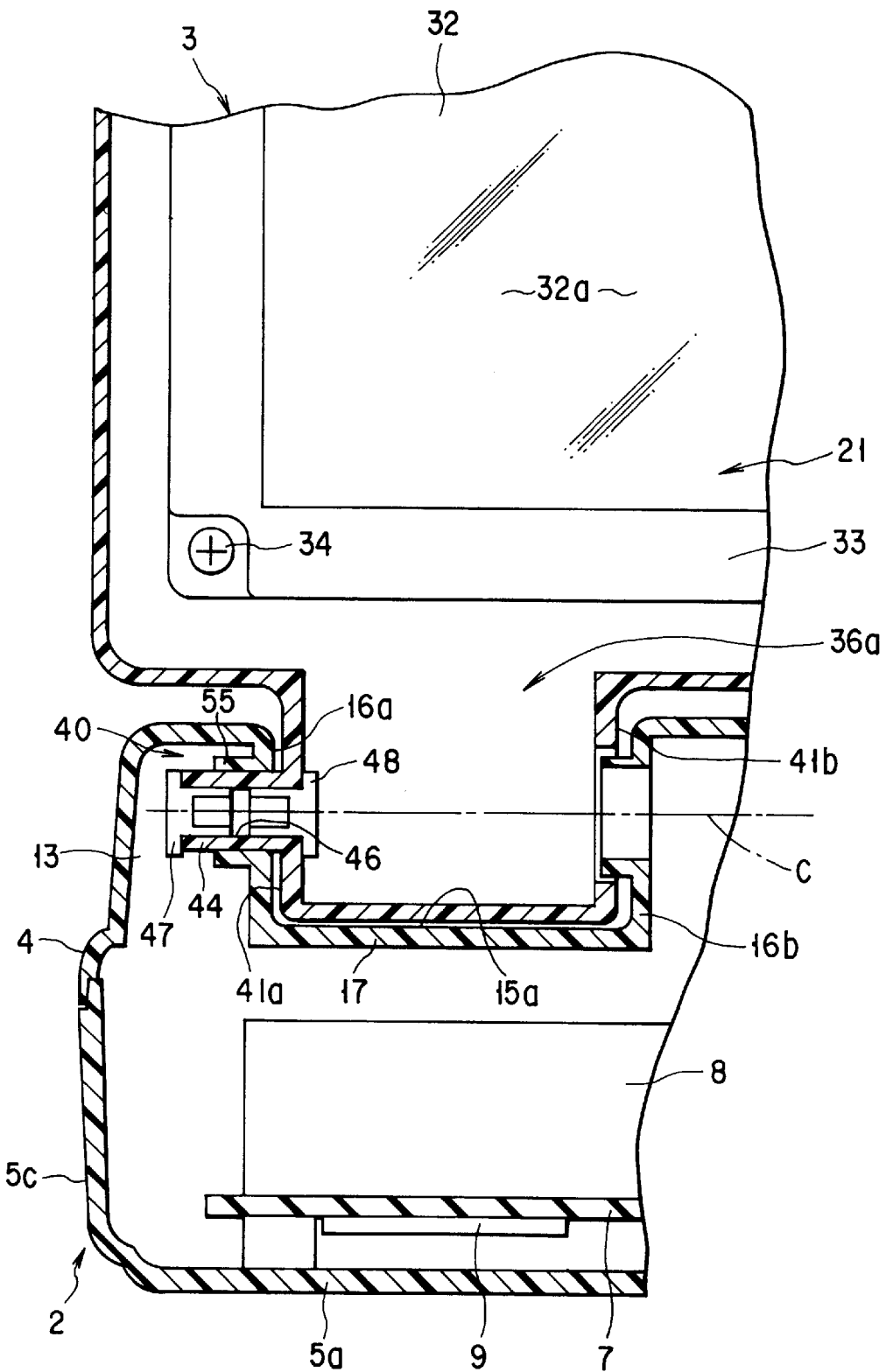
FIG. 4 is a sectional view corresponding to FIG. 2, showing a modification of the portable computer.

In the above-mentioned embodiment, the light emission element 47 is provided in the convex portion 13 of the apparatus body 2 and the light receive element 48 is provided in the first support leg 36a of the display unit. However, the present invention is not limited to this structure, but the light emission element 47 and the light receive element 48 may be provided in the boss 44 of the hinge portion 40, as shown in FIG. 4. In this structure, the light emission surface of the light emission element 47 is closer to the light receive surface of the light receive element 48 than in the above-mentioned structure, so that transmission losses of light can be reduced much more. Therefore, the sizes of the elements used for transmitting and receiving light can further be reduced, and the output of light from the light emission element 47 can also be reduced much more.

In addition, as shown in FIG. 4, a cylindrical boss 55 for the apparatus body side may be formed at the side wall 16a of the first display support portion 15a of the apparatus body 2, and the boss 44 of the display unit 3 side may be rotatably engaged in the boss 55, such that the boss 55 covers the boss 44. In this case, interference waves (or disturbance light) can be prevented more securely, so that data can be transmitted and received more accurately.

In the above embodiment, explanation has been made to a case in which transmission and receipt of image signals between the computer body 2 and the display unit 3. The present invention, however, is not limited to this embodiment, but the following structure may be adopted.

Specifically, electric signals are converted into optical signals by the data conversion circuit 52 of the apparatus body 2, and optical outputs from the data conversion circuit 52 are supplied through an optical fiber or the like to a first optical connector which is provided in place of the light emission element 47. In addition, a second optical connector for receiving light from the first optical connector is provided in place of the light receive element 48, and light received by the second optical connector is supplied through an optical fiber or the like to the photoelectric conversion circuit 49 in which the light received is converted into electric signals.

In the next, a second embodiment in which the present invention is adopted to a portable computer will be explained with reference to FIGS. 5 to 9. Note that the same portions as those in the first embodiment will be denoted by the same reference numerals, and detailed explanation of those portions will be omitted herefrom. The followings specifically explain those portions which are different from the first embodiment.

According to the second embodiment, the first and second support legs 36a and 36b of the display unit 3 are formed to have widths greater than those of the first embodiment, in the widthwise direction of the apparatus body 2. Further, an end of the first support leg 36a and an end of the second support leg 36b are supported on the housing 4 by a known hinge portion. In addition, a light emission element 47 and a light receive element 48 for transmitting and receiving image signals between the apparatus body 2 and the display unit 3 are provided at a connecting portion between the other end portion of the first support leg 36a and the apparatus body 2.

Specifically, the other end portion of the first support leg 36a is constructed as shown in FIG. 6. Circular holes 61 and 62 are respectively formed in the side wall 41b of the first support leg 36a and the side wall 16b of the first display support portion 15a facing the side wall 41b, such that the circular holes 61 and 62 coaxially face each other. These holes 61 and 62 are formed to be coaxial with the rotation center axis C of the hinge portion.

A cylindrical joint member 63 is engaged in the holes 61 and 62, and is positioned to be coaxial with the rotation center axis C. In this case, the joint member 63 is engaged to be slidable with respect to one or both of the holes 61 and 62. In addition, flanges are formed at both end portions of the joint member 63 so that the joint member 63 does not fall out of the holes 61 and 62. A plating layer 64 made of metal material such as aluminum or the like which functions as a shield means is formed on the inner surface of the joint member 63. Note that an aluminum shield plate may be provided as a shield means on the inner surface of the joint member.

In the concave portion 13 of the apparatus body 2, a light emission element 47 for transmitting image signals in form of light, prepared by the main circuit of the apparatus body, is arranged in the vicinity of an end portion of the joint member 63. Further, in the first support leg 36a of the display unit 3, a light receive element 48 for receiving light from the light emission element 47 through the joint member 63 is arranged in the vicinity of the other end portion of the joint member 63.

These light emission element 47 and light receive element 48 are disposed on the rotation center axis C of the hinge portion, and the light emission surface of the light emission element 47 and the light receive surface of the light receive element 48 face each other through the inner hole of the joint member 63. Thus, the joint member 63, the light emission element 47, and the light receive element 48 are arranged to be coaxial with the rotation center axis C of the hinge portion. Therefore, the light emission surface of the light emission element 47 and the light receive surface of the light receive element 48 are continuously kept facing each other, even when the display unit 3 is rotated with respect to the apparatus body 2.

Note that the circuit configuration and the operation of the second embodiment will be the same as those of the first embodiment described before.

According to the second embodiment constructed in the structure as described above, transmission and receipt of image signals can be performed between the apparatus body 2 and the display unit 3, in a cordless manner, like in the first embodiment described before. Further, since optical communication is performed with use of serial data, it is easy to respond to an increase in amount of data necessary for displaying an image, with the same structure. As a result of this, cords for connecting the apparatus body 2 and the display unit 3 with each other are not required, and the durability of a personal computer can be improved.

In addition, since the light emission surface of the light emission element 47 and the light receive surface of the light receive element 48 can be continuously kept facing each other when the display unit 3 is rotated, linear propagation of light is ensured and the light receiving accuracy is improved. Therefore, it is very advantageous that accurate transmission and receipt of data is realized and an infrared ray which has a relatively short wavelength and does not much influence other electronic devices can be used.

Figure 7:
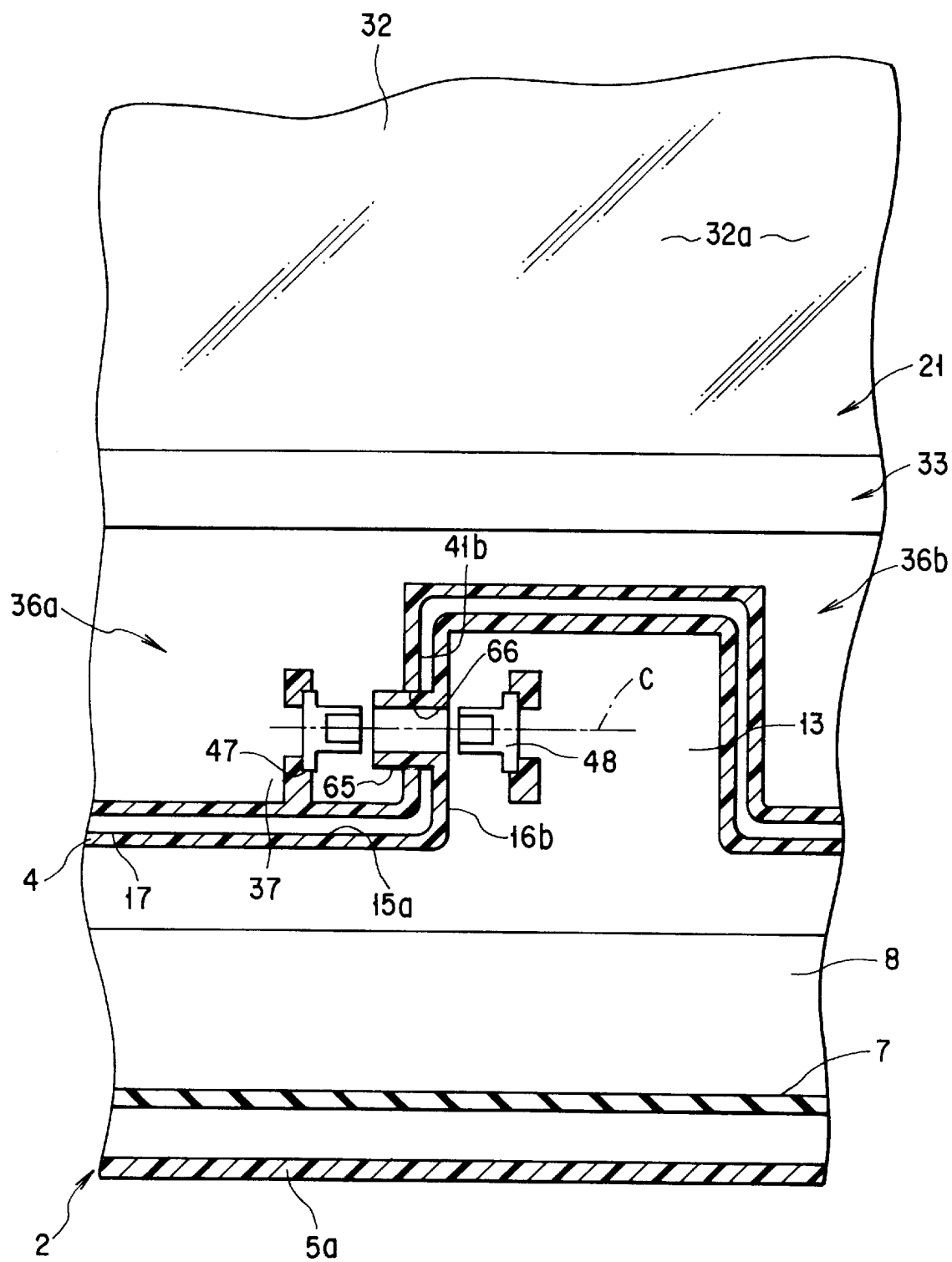
FIG. 7 is a sectional view corresponding to FIG. 6, showing a modification of the portable computer according to the second embodiment of the present invention.

In the second embodiment, it is possible to provide a boss 65 projecting horizontally from one side wall 16b of the first display support portion 15a in the widthwise direction of the apparatus body 2, in place of providing a joint member 63, such that the boss 65 is rotatably inserted in a hole portion 66 formed in the side wall 41b of the first support leg 36a and the inner hole of the boss 65 serves as a communication path for light, as shown in FIG. 7.

Figure 8:
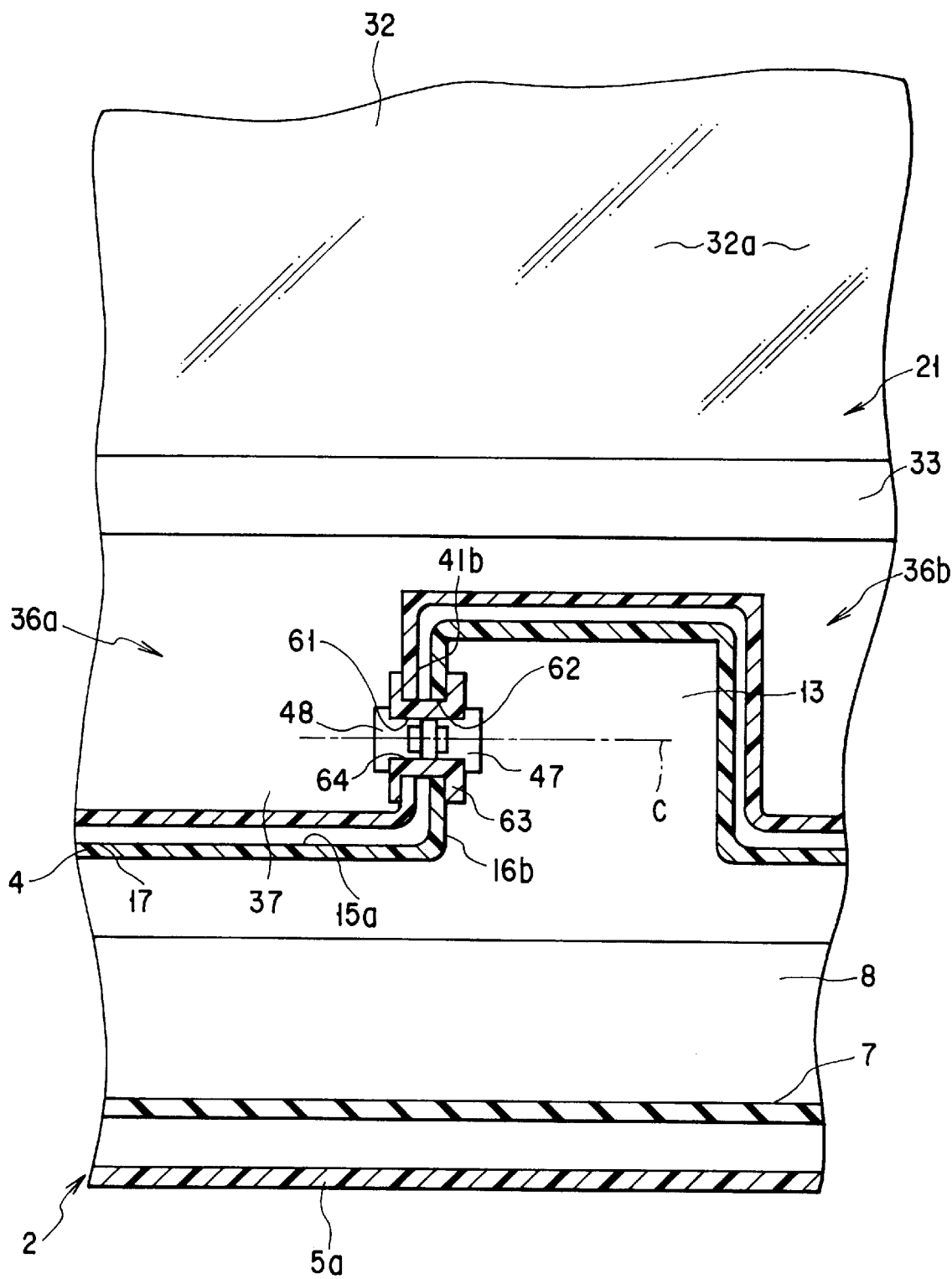
FIG. 8 is a sectional view corresponding to FIG. 6, showing another modification of the portable computer according to the second embodiment of the present invention.
Figure 9:
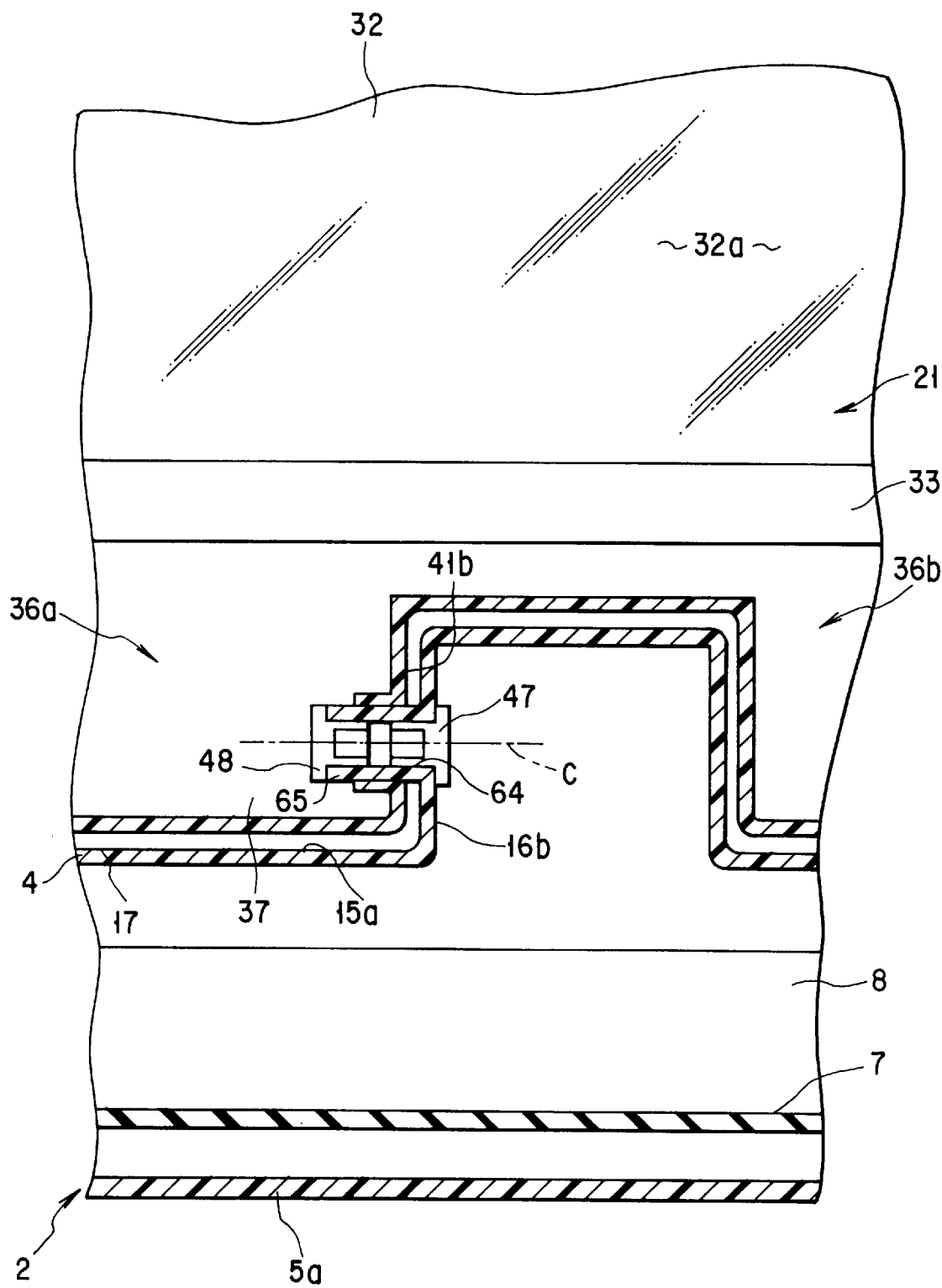
FIG. 9 is a sectional view corresponding to FIG. 6, showing still another modification of the portable computer according to the second embodiment of the present invention.

Also, in the second embodiment, the light emission element 47 and the light receive element 48 may be provided to be fitted in the joint member 63, as shown in FIG. 8. Further, in the structure shown in FIG. 7 where a boss 65 is provided in place of a joint member 63, the light emission element 47 and the light receive element 48 may be engaged with the boss 65, as shown in FIG. 9.

In the structure as described above, the light emission surface of the light emission element 47 is closer to the light receive surface of the light receive element 48 than in the above-mentioned structure, so that transmission losses of light can be reduced much more. Therefore, the sizes of the elements used for transmitting and receiving light can further be reduced, and the output of light from the light emission element 47 can also be reduced much more.

In the embodiments as described above, explanation has been made to cases in which transmission and receipt of image signals are carried out with use of light between the apparatus body 2 and the display unit 3. However, the present invention is not limited to these embodiments, but the transmission and receipt of image signals may be performed with use of electro-magnetic waves between the apparatus body 2 and the display unit 3. In this manner, also, transmission and receipt of image signals can be performed in a cordless manner. In this case, the inner hole of the boss 44 and the inner hole of the joint member 63, forming a communication path for electromagnetic waves, should be provided with magnetic shields to prevent influences on other electronic devices.

Note that the present invention is not limited to a portable computer but is applicable to other portable electronic apparatuses such as a word processor and the likes.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

I claim:

1. A portable electronic apparatus comprising:
a first unit;
a second unit rotatably connected with the first unit through a hinge portion;
a cylindrical joint member arranged to be coaxial with a rotation center axis of the hinge portion and rotatably supporting the second unit with respect to the first unit, the joint member having one end portion projecting into the first unit and another end portion projecting into the second unit, the joint member defining a communication path which extends to be coaxial with the rotation center axis of the hinge portion and has one end communicating with an inner space of the first unit and another end communicating with an inner space of the second unit;
a light emission element provided in the first unit for emitting an optical signal to the second unit through the communication path; and
a light receive element arranged in the second unit so as to face the light emission element through the communication path for receiving the optical signal from the light emission element.

2. A portable electronic apparatus according to claim 1, wherein the joint member includes shield means for shielding the optical signal passing through the communication path from external noise.

3. A portable electronic apparatus according to claim 1, wherein the light emission element is provided so as to face one end of the communication path, and the light receive element is provided so as to face another end of the communication path.

4. A portable electronic apparatus according to claim 1, wherein the light emission element is fitted in the end of the joint member, and the light receive element is fitted in another end of the joint member.

5. A portable electronic apparatus comprising:
an apparatus body;
a display device rotatably connected with the apparatus body through a hinge portion, and including display means for displaying an image;
a cylindrical joint member arranged to be coaxial with a rotation center axis of the hinge portion and rotatably supporting the display device with respect to the apparatus body, the joint member having one end portion projecting into the apparatus body and another end portion projecting into the display means, the joint member defining a communication path which extends to be coaxial with the rotation center axis of the hinge portion and has one end communicating with an inner space of the apparatus body and another end communicating with an inner space of the display device;
a light emission element arranged in the apparatus body, for emitting an optical signal in the form of image data to the display device through the communication path; and
a light receive element arranged in the display device so as to face the light emission element through the communication path for receiving the optical signal from the light emission element.

6. A portable electronic apparatus according to claim 5, wherein the display device has a hollow support leg, the apparatus body has a support portion for rotatably supporting the support leg, and the joint member is provided so as to bridge the support leg and the support portion.

7. A portable electronic apparatus according to claim 5, wherein the display device has a hollow support leg, the apparatus body has a support portion for rotatably supporting the support leg, and the projecting portion projects from the support leg into the support portion and is rotatably engaged with the support portion around the rotation center axis.

8. A portable electronic apparatus according to claim 5, wherein the joint member includes shield means for shielding the image signal passing through the communication path from external noise.

9. A portable electronic apparatus according to claim 5, further comprising circuit means arranged in the apparatus body for supplying the image data to the light emission element, and
conversion circuit means provided in the display device for converting the optical signal received by the light receive element into the image signal and for supplying the image signal to the display means.

10. A portable electronic apparatus according to claim 5, further comprising circuit means provided in the apparatus body for supplying the image data to the light emission element, and
conversion circuit means provided in the display device for converting the optical signal received by the light receive element into the image signal, and for supplying the image signal to the display means.

11. A portable electronic apparatus comprising:
a first unit;
a second unit rotatably connected with the first unit through a hinge portion;

a hollow projecting portion projecting into the first unit from the second unit and rotatably engaged with the first unit, the projecting portion extending to be coaxial with a rotation center axis of the hinge portion and rotatably supporting the second unit with respect to the first unit, the projecting portion defining a communication path which extends to be coaxial with the rotation center axis of the hinge portion and has one end communicating with an inner space of the first unit and another end communicating with an inner space of the second unit;

a light emission element provided in the first unit for emitting an optical signal to the second unit through the communication path; and a light receive element arranged in the second unit so as to face the light emission element through the communication path for receiving the optical signal from the light emission element.

12. A portable electronic apparatus according to claim 11, wherein the projecting portion includes shield means for shielding the optical signal passing through the communication path from external noise.

13. A portable electronic apparatus according to claim 11, wherein the light emission element is provided so as to face one end of the communication path, and the light receive element is provided so as to face another end of the communication path.

14. A portable electronic apparatus according to claim 1, wherein the light emission element is fitted in the end of the projecting portion, and the light receive element is fitted in another end of the projecting portion.

15. A portable electronic apparatus comprising:

an apparatus body;

a display device rotatably connected with the apparatus body through a hinge portion, and including display means for displaying an image;

a hollow projecting portion projecting into the apparatus body from the display device and rotatably engaged with the apparatus body, the projecting portion extending to be coaxial with a rotation center axis of the hinge portion and rotatably supporting the display device with respect to the apparatus body, the projecting portion defining a communication path which extends to be coaxial with the rotation center axis of the hinge portion and has one end communicating with an inner space of the apparatus body and another end communicating with an inner space of the display device;

a light emission element arranged in the apparatus body for emitting an optical signal in the form of image data to the display device through the communication path; and a light receive element arranged in the display device so as to face the light emission element through the communication path for receiving the optical signal from the light emission element.

16. A portable electronic apparatus according to claim 15, wherein the projecting portion includes shield means for shielding the image signal passing through the communication path from external noise.

17. A portable electronic apparatus according to claim 15, further comprising circuit means arranged in the apparatus body for supplying the image data to the light emission element, and conversion circuit means provided in the display device for converting the optical signal received by the light receive element into the image signal and for supplying the image signal to the display means.

18. A portable electronic apparatus according to claim 15, further comprising circuit means provided in the apparatus body for supplying the image data to the light emission element, and conversion circuit means provided in the display device for converting the optical signal received by the light receive element into the image signal, and for supplying the image signal to the display means.

* * * * *